(12) United States Patent
Hiraguchi

(10) Patent No.: US 7,350,731 B2
(45) Date of Patent: Apr. 1, 2008

(54) RECORDING TAPE CARTRIDGE

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 208 days.

(21) Appl. No.: 10/935,238

(22) Filed: Sep. 8, 2004

(65) Prior Publication Data
US 2005/0051654 A1 Mar. 10, 2005

(30) Foreign Application Priority Data
Sep. 9, 2003 (JP) .............. 2003-316728

(51) Int. Cl.
*G11B 23/107* (2006.01)
(52) U.S. Cl. .................. 242/338.1; 242/348
(58) Field of Classification Search .......... 242/338.1, 242/338.3, 343, 343.1, 343.2, 348, 348.1, 242/348.2, 348.3; 360/132
See application file for complete search history.

(56) References Cited

U.S. PATENT DOCUMENTS

| | | | |
|---|---|---|---|
| 4,736,903 A | * | 4/1988 | Landry et al. .......... 242/338.3 |
| 5,436,782 A | * | 7/1995 | Sieben .................... 360/132 |
| 5,813,622 A | | 9/1998 | Von Alten |
| 5,901,916 A | | 5/1999 | McAllister et al. |

FOREIGN PATENT DOCUMENTS

| | | |
|---|---|---|
| JP | 63-251983 A | 10/1988 |
| JP | 11-25648 A | 1/1999 |
| JP | 3187022 B2 | 7/2001 |

* cited by examiner

*Primary Examiner*—Peter M. Cuomo
*Assistant Examiner*—Scott Haugland
(74) *Attorney, Agent, or Firm*—Sughrue Mion, PLLC

(57) ABSTRACT

In a recording tape cartridge, a reel locking member, which is positioned at a rotation locking position meshes with an engaging gear which is in a form of internal teeth and which is at a reel, such that rotation of the reel with respect to a case is impeded. When a clutch member is pushed up, a rotating cam member, which is screwed together with the clutch member, rotates toward one side, and the reel locking member moves to a releasing position by a positive motion cam structured by a cam projection and a cam groove. When the clutch member is pushed downward, the rotating cam member rotates toward another side, and the reel locking member moves to the rotation locking position by the positive motion cam.

19 Claims, 8 Drawing Sheets

RECORDING TAPE CARTRIDGE

CROSS-REFERENCE TO RELATED APPLICATION

This application claims priority under 35 USC 119 from Japanese Patent Application No. 2003-316728, the disclosure of which is incorporated by reference herein.

BACKGROUND OF THE INVENTION

1. Field of the Invention

The present invention relates to a recording tape cartridge which rotatably accommodates a single reel on which a recording tape, such as a magnetic tape or the like, is wound.

2. Description of the Related Art

Recording tapes such as magnetic tapes and the like are used as external recording media for computers and the like. For a recording tape where a large volume of information is recordable and which is wound around a reel, a single reel cartridge whose reel is rotatably accommodated in a compact space is employed.

Such a recording tape cartridge has a braking means so that the reel does not rotate within the case when the recording tape cartridge is not in use (see, for example, Japanese Patent Application Laid-Open (JP-A) No. 63-251983). This JP-A No. 63-251983 discloses the following structure: an engaging gear is provided in an annular form at the floor surface of a reel hub which is shaped as a hollow cylinder having a floor and which structures the axially central portion of a reel. A locking member, which is disc-shaped and at which is provided a braking gear which can mesh with the engaging gear, is inserted within the reel hub. The locking member is supported so as to be unable to rotate with respect to the case, and so as to be slidable in the axial direction of the reel. Due to the urging force of a compression coil spring provided between the case and the locking member, the braking gear is made to mesh with the engaging gear of the reel. In this state, the reel is pressed against the floor plate of the case by the urging force of the compression coil spring. Rotation of the reel with respect to the case is locked due to the braking gear of the locking member meshing with the engaging gear due to this urging force.

In this structure, a pass-through hole is formed in the floor portion of the reel hub. When a releasing portion of a drive device enters in from this pass-through hole and pushes the locking member upward against the urging force of the compression coil spring, the meshed-together state of the braking gear and the engaging gear is cancelled, and rotation of the reel with respect to the case is permitted. The releasing member of the drive device is provided at a rotating shaft together with a driving gear which meshes with a reel gear formed at the end surface of the reel hub. As the driving gear meshes with the reel gear, the releasing portion pushes the locking member upward. Accordingly, in this structure, when the rotating shaft drives and rotates the reel, the locking member, which cannot rotate with respect to the case, and the releasing member, which rotates integrally with the rotating shaft, slidingly-contact one another while being pressed against one another due to the urging force of the compression coil spring. In order to reduce the resistance to rotation which arises accompanying this sliding-contact, the locking member and the releasing portion are both formed of resin materials.

Further, a structure which is similar to that disclosed in JP-A No. 63-251983 has been conceived of in which a releasing member, which rotates integrally with the reel, is provided between the locking member and the floor portion of the reel hub (see, for example, Japanese Patent No. 3187022). Specifically, the releasing member is exposed to the exterior from through holes formed in the reel at the region where the reel gear is formed. Due to the releasing member being pressed by the addenda of the driving gear of the drive device, the releasing member is pushed upward together with the locking member against the urging force of the compression coil spring. In this way, the locking member is pushed upward via the releasing member, and the locked state of the reel is cancelled. In this structure, at the time when the reel is driven to rotate, the releasing member rotates integrally with the reel. Therefore, the addenda of the driving gear and the releasing member do not slidingly-contact one another, and the releasing member and the locking member slidingly-contact one another.

Moreover, a structure is known in which, at the time when the reel is driven to rotate, the locking member does not slidingly-contact any other portion (see, for example, JP-A No. 11-25648). In this structure, the engaging gear is formed at the outer peripheral portion of a flange of the reel. Rotation of the reel is locked due to two locking members, each of which is rotatably supported within the case and is urged in the direction of meshing with the engaging gear, meshing together with the engaging gear. Further, when this recording tape cartridge is loaded into a drive device, the locking members are pressed by releasing portions of the drive device, and rotate against the aforementioned urging force. In this way, the meshing together of the locking members and the engaging gear is released, and rotation of the reel is permitted. These releasing portions are respectively provided independently of the rotating shaft, and push the locking members due to the loading of the recording tape cartridge (the case) into the drive device or the lowering of the recording tape cartridge (the case) within the drive device. In this structure, the compression coil spring, which is for pressing the reel against the case or the rotating shaft, is connected to the reel via a bearing. Relative rotation between the compression coil spring and the reel is absorbed by the bearing.

However, in the structures disclosed in JP-A No. 63-251983 and Japanese Patent No. 3187022, the urging force of the compression coil spring is applied as drag to the region of sliding contact between the locking member and the releasing member, or between the locking member and the releasing portion of the drive device. Therefore, when, in accordance with the trend of making recording tape cartridges have higher recording capacities, the recording tape is made to be longer and the rotational speed of the reel is made to be a high speed, or the time over which the reel is continuously driven is extended, there is the concern that wear will arise at these regions of sliding contact. In the structure disclosed in JP-A No. 11-25648, the urging means for urging the locking member in the direction of meshing with the engaging gear, and the compression coil spring which urges the reel toward the floor plate of the case, are separate members. Therefore, the relative rotation between the reel and the compression coil spring cannot be absorbed by the locking member which rotates relative to the reel, and this relative rotation must be absorbed by an expensive bearing.

Moreover, in the recording tape cartridges relating to the above-described structures, when the recording tape is not being used, the reel is pressed against the floor plate of the case by the urging force of a compression coil spring. Therefore, when force resisting the urging force of the compression coil spring is applied, upward and downward movement of the reel within the case cannot be impeded (locked). Thus, for example, if the region where the reel gear is formed at the reel, which region is exposed from the case (i.e., the outer surface of the floor portion of the reel hub), were to be pushed or if impact of a drop were to be applied to this region, the reel would joggle greatly within the case, which could be a cause of damage to the recording tape whose one end portion is held at the case via a leader member.

In this way, various problems arise in conventional recording tape cartridges because the conventional recording tape cartridges are provided with a compression coil spring which urges the reel with respect to the case either directly or via a locking member.

SUMMARY OF THE INVENTION

In view of the aforementioned, an object of the present invention is to provide a recording tape cartridge in which there is no need to provide an urging means for urging a reel or a locking member with respect to a case.

In order to achieve the above object, a recording tape cartridge relating to a first aspect of the present invention comprises: a reel at which a recording tape is wound around an outer peripheral portion of a hub formed in a hollow-cylindrical shape, the reel being rotatably accommodated within a case; an internal gear provided coaxially at an inner side of the hub, and always rotating integrally with the reel; a locking member supported so as to be unable to rotate with respect to the case, and moving in a radial direction of the hub so as to be able to be set at a rotation locking position at which the locking member meshes with the internal gear, and a releasing position at which the locking member cancels the meshing; a rotating cam member supported so as to be able to rotate with respect to the case, the rotating cam member and the locking member structuring a positive motion cam which rotates toward one side and moves the locking member from the rotation locking position to the releasing position, and rotates toward another side and moves the locking member from the releasing position to the rotation locking position; and an operated member disposed so as to be exposed to an exterior of the case, and rotating the rotating cam member one of toward the one side and toward the other side in accordance with a direction in which the operated member is operated by a drive device.

When, for example, the recording tape cartridge is not being used, the locking member, which cannot rotate with respect to the case, is positioned at the rotation locking position at which the locking member meshes with the internal gear of the reel, and impedes rotation of the reel with respect to the case. When the recording tape cartridge is loaded in a drive device and the operated member is operated in a predetermined direction, the rotating cam member rotates toward the one side. Accompanying this rotation, the positive motion cam, which is structured by the rotating cam member and the locking member, moves the locking member toward the inner side in the radial direction of the reel. In this way, the locking member moves to the releasing position at which the locking member releases the meshing with the internal gear, and rotation of the reel with respect to the case becomes possible. Moreover, when, from this rotatable state, the operated member is operated in the direction opposite to the aforementioned predetermined direction, the rotating cam member rotates toward the other side, and the positive motion cam moves the locking member toward the outer side in the radial direction of the reel.

In this way, the locking member moves to the rotation locking position, and rotation of the reel with respect to the case is again impeded.

Here, the rotating cam member rotates reciprocatingly in accordance with the direction in which the operated member is operated by the drive device, and the locking member moves between the rotation locking position and the releasing position due to the reciprocating rotation of the rotating cam member. Therefore, the function of impeding rotation of the reel when the recording tape cartridge is not being used can be exhibited without providing an urging means for urging the locking member toward the rotation locking position.

In this way, in the recording tape cartridge, there is no need to provide an urging means for urging the locking member with respect to the case. Therefore, even if the operated member is structured so as to slidingly contact the rotating shaft of the drive device when the reel is driven to rotate, urging force is not applied to the region of sliding contact. Therefore, wear of the rotating shaft or the operated member can be prevented or markedly suppressed. Note that the operated member may be provided separately from the rotating cam member and may have, together with the rotating cam member, a converting means for converting the motion in the direction of operation into rotation of the rotating cam member. Or, the operated member may be provided integrally with the rotating cam member, and be operated in the rotating direction toward the one side or the other side by the drive device.

In the recording tape cartridge relating to the first aspect of the present invention, the operated member may be disposed so as to move reciprocatingly along an axis of the hub in accordance with the direction in which the operated member is operated by the drive device, and a spiral groove may be provided around the axis at one of the rotating cam member and the operated member, and a convex portion, which is slidably disposed within the spiral groove, may be provided in another of the rotating cam member and the operated member.

In this recording tape cartridge, when the operated member is operated by the drive device and moves toward one side in the axial direction of the hub, this movement is converted into rotation of the rotating cam member toward one side, while the groove walls of the spiral groove and the convex portion slide along one another. Further, when the operated member is operated by the drive device and moves toward the other side in the axial direction of the hub, this movement is converted into rotation of the rotating cam member toward the other side, while the groove walls of the spiral groove and the convex portion slide along one another. In this way, merely due to the operated member being reciprocatingly moved in the axial direction of the hub, the locking member can be moved between the rotation locking position and the releasing position, and the structure is simple. Moreover, the structure at the drive device also can be simplified.

For example, the angle of inclination (the angle of the spiral) of the spiral groove with respect to the axis of the hub can be made to be large, and the rotating cam member can be easily rotated by the moving force along this axis which moving force is inputted to the operated member. However, it is possible to set the structure such that, when torque is inputted to the rotating cam member, the rotating cam member does not rotate (is difficult to rotate) due to the static friction between the spiral groove and the convex portion. In this structure (i.e., with this setting), it is possible to prevent the locking member from moving without the operated member being operated, and the locking member can be held at the rotation locking position by the static friction.

In the recording tape cartridge relating to the present invention, in the recording tape cartridges described heretofore, when movement of the locking member in an axial direction of the hub is restricted and the locking member is positioned at the rotation locking position, the locking member may abut a surface of the reel which surface intersects the axis, and when the locking member is positioned at the releasing position, the locking member may release the state of abutment.

In this recording tape cartridge, the locking member which is positioned at the rotation locking position abuts a surface of the reel which surface intersects the axis (the axis of the hub), and movement of the locking member in the axial direction of the hub is restricted. Movement of the reel in the axial direction is thereby restricted. When the locking member moves to the releasing position, the state of abutment with the surface of the reel which surface intersects the axis is cancelled, and the locking member permits rising-up (axial direction movement) of the reel with respect to the case. In this way, the reel is able to rotate with respect to the case without contacting the case.

Accordingly, in the present recording tape cartridge, joggling of the reel within the case when the recording tape cartridge is not being used can be prevented or suppressed, without providing an urging means for pushing the reel against the case. Therefore, there is no need to provide an expensive bearing or the like for absorbing relative rotation between the reel and an urging member.

In the recording tape cartridge relating to the present invention, in addition to the above-described variations of and additions to the recording tape cartridge, a plurality of the locking members may be provided, and the positive motion cams may be structured by the respective plural locking members and the rotating cam member.

In this recording tape cartridge, a plurality of the locking members, which move in the radial direction of the hub and mesh with the internal gear provided coaxially at the inner side of the hub of the reel, are provided. Therefore, movement of the reel in the radial direction is restricted by the plural locking members which are respectively positioned at their rotation locking positions. Thus, it is possible to prevent the locked state of the reel from being cancelled inadvertently due to joggling of the reel in the radial direction.

The plural locking members, together with the single rotating cam member, structure positive motion cams. Therefore, the locking members move between their rotation locking positions and their rotation permitting positions due to the single operated member being operated by a drive device. Thus, there are fewer parts, and the structure of the drive device does not become complex.

In order to achieve the above-described object, a recording tape cartridge relating to a second aspect of the present invention comprises: a reel accommodated within a case, an engaging portion being provided within a hollow-cylindrical hub around whose outer peripheral portion a recording tape is wound; a locking member supported so as to be unable to rotate with respect to the case, and able to be set at a rotation locking position, at which the locking member engages with the engaging portion and, together with the case, nips the reel, and a rotation permitting position, at which the locking member cancels a state of engagement with the engaging portion and a state of nipping the reel; and switching means, provided within the case, for holding the locking member at the rotation locking position when the recording tape is not in use, and for moving the locking member to the rotation permitting position when the switching means is operated in a predetermined direction by a drive device, and for moving the locking member to the rotation locking position when the switching means is operated by the drive device in a direction opposite to the predetermined direction.

In this recording tape cartridge, when the recording tape is not being used, the switching means holds the locking member at the rotation locking position. In this way, the locking member is engaged with the engaging portion of the reel, rotation of the reel with respect to the case is impeded, and the reel is nipped between the locking member and the case such that axial direction movement of the reel is restricted. When the recording tape cartridge is loaded into a drive device and the switching means is operated in a predetermined direction, the locking member moves to the rotation permitting position, engagement of the locking member and the engaging portion is released, nipping of the reel is released, and it becomes possible for the reel to rotate with respect to the case and to rise up (move in the axial direction) with respect to the case. Moreover, when, from this rotation permitted state, the switching means is operated in the direction opposite to the predetermined direction, the locking member returns to its rotation locking position, and rotation of the reel with respect to the case and rising-up of the reel with respect to the case are impeded.

Here, the locking member can be moved between the rotation locking position and the rotation permitting position in accordance with the direction of operation of the switching means. Therefore, the function of impeding rotation of the reel when the recording tape cartridge is not in use can be exhibited without providing an urging means for urging the locking member toward the rotation locking position. Moreover, the reel is nipped between the case and the locking member which is held at the rotation locking position by the switching means. Thus, joggling of the reel within the case when the recording tape cartridge is not in use can be prevented or suppressed without providing an urging means for pushing the reel against the case. Note that it suffices for the nipping of the reel between the case and the locking member which is positioned at the rotation locking position, to prevent or suppress rising-up of the reel with respect to the case, and it is not necessary for there to be abutment without a gap or application of pressing force.

In this way, in the recording tape cartridge relating to the second aspect of the present invention, there is no need to provide an urging means for urging the reel and the locking member with respect to the case. Therefore, even if the switching means is structured so as to slidingly contact the rotating shaft of the drive device when the reel is driven to rotate, urging force is not applied to the region of sliding contact, and therefore, wear of the rotating shaft or the switching means can be prevented or markedly suppressed. Further, there is no need to provide an expensive bearing or the like for absorbing relative rotation between the reel and an urging member.

As described above, the recording tape cartridge relating to the present invention has the excellent effect that there is no need to provide an urging means for urging a reel or a locking member with respect to a case.

DETAILED DESCRIPTION OF THE INVENTION

A recording tape cartridge 10 to which is applied a reel 28 relating to an embodiment of the present invention will be described on the basis of FIGS. 1 through 4.

(Overall Structure of Recording Tape Cartridge)

Figure 1A:
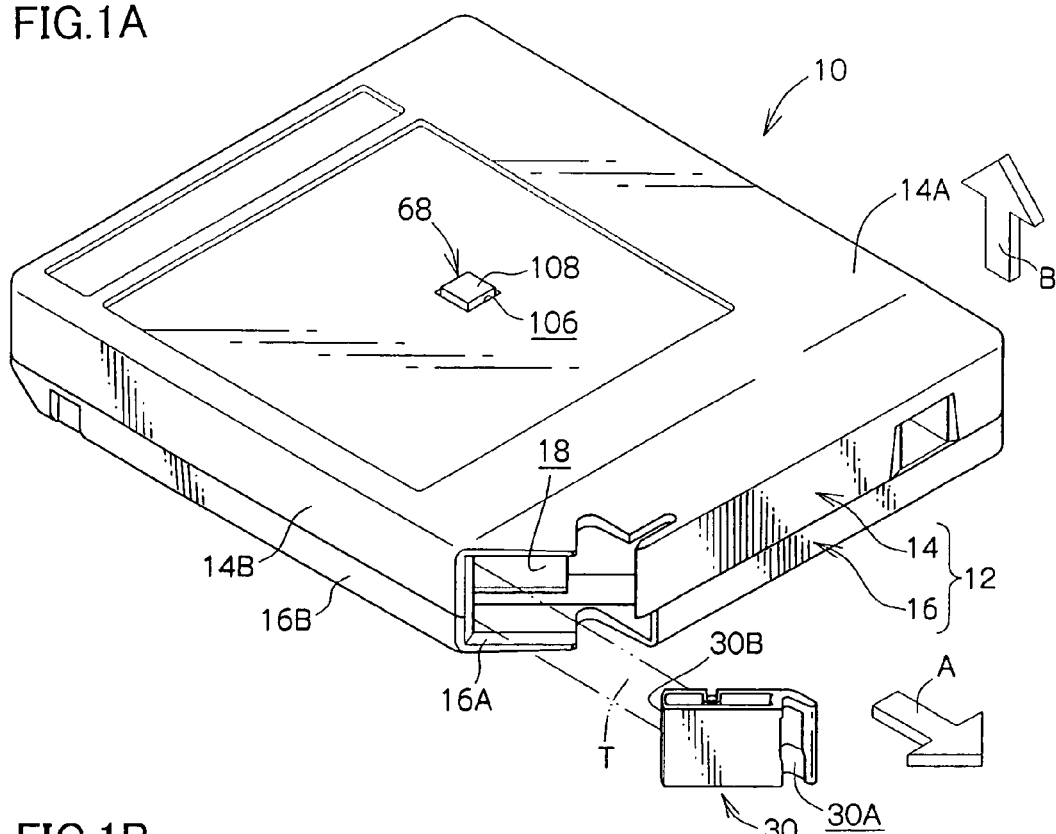
FIG. 1A is a drawing showing the exterior of a recording tape cartridge relating to an embodiment of the present invention, and is a perspective view seen from above.
Figure 1B:
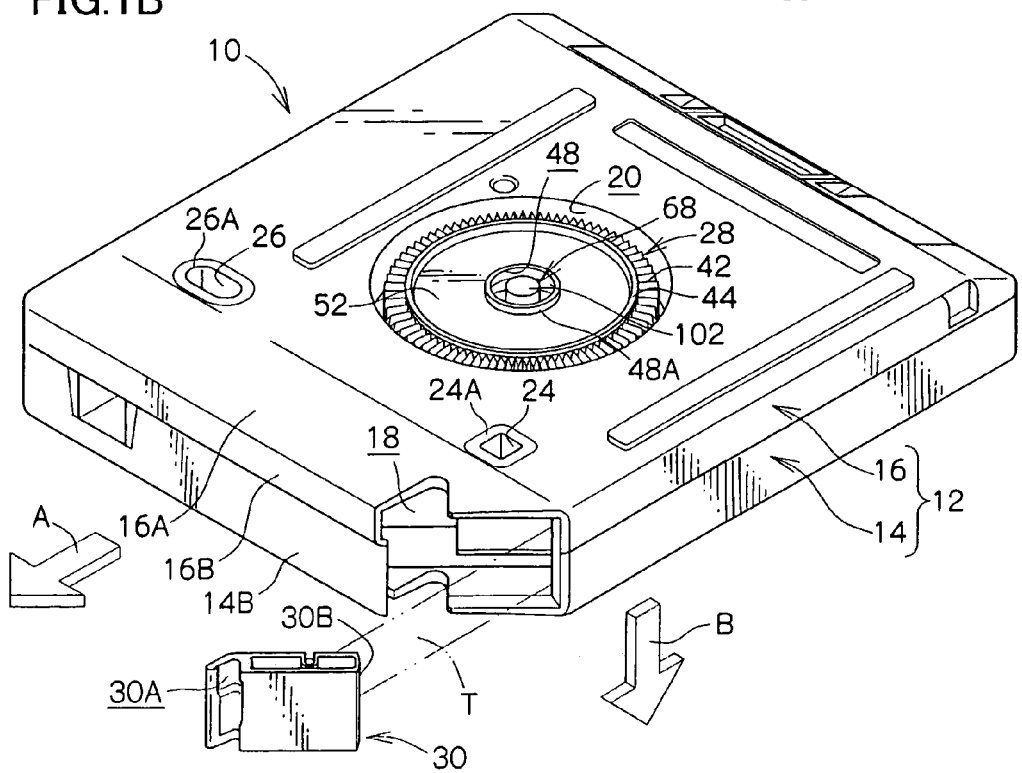
FIG. 1B is a drawing showing the exterior of the recording tape cartridge relating to the embodiment of the present invention, and is a perspective view seen from below.
Figure 2:
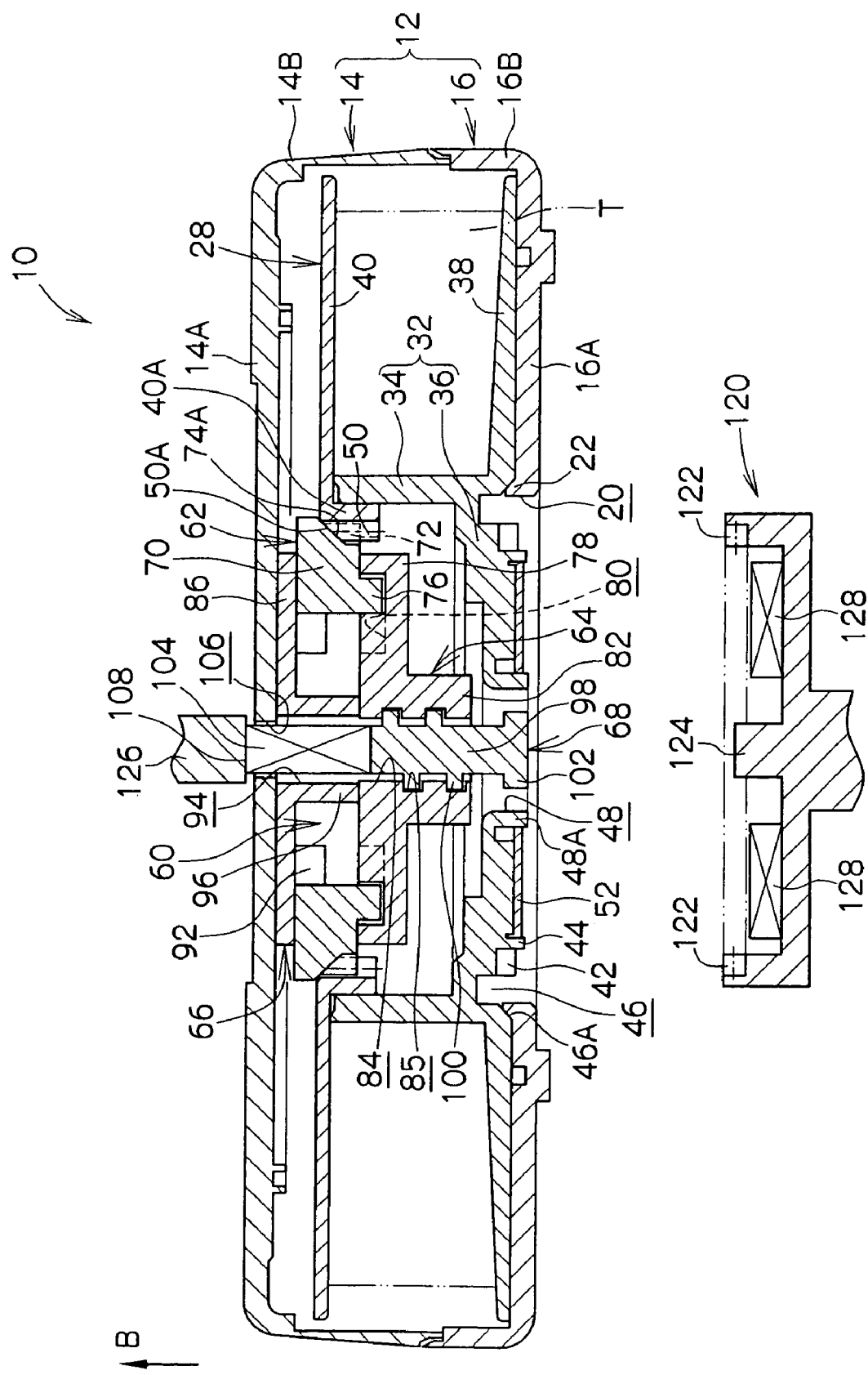
FIG. 2 is a sectional view of a state in which rotation of a reel is locked in the recording tape cartridge relating to the embodiment of the present invention.
Figure 3:
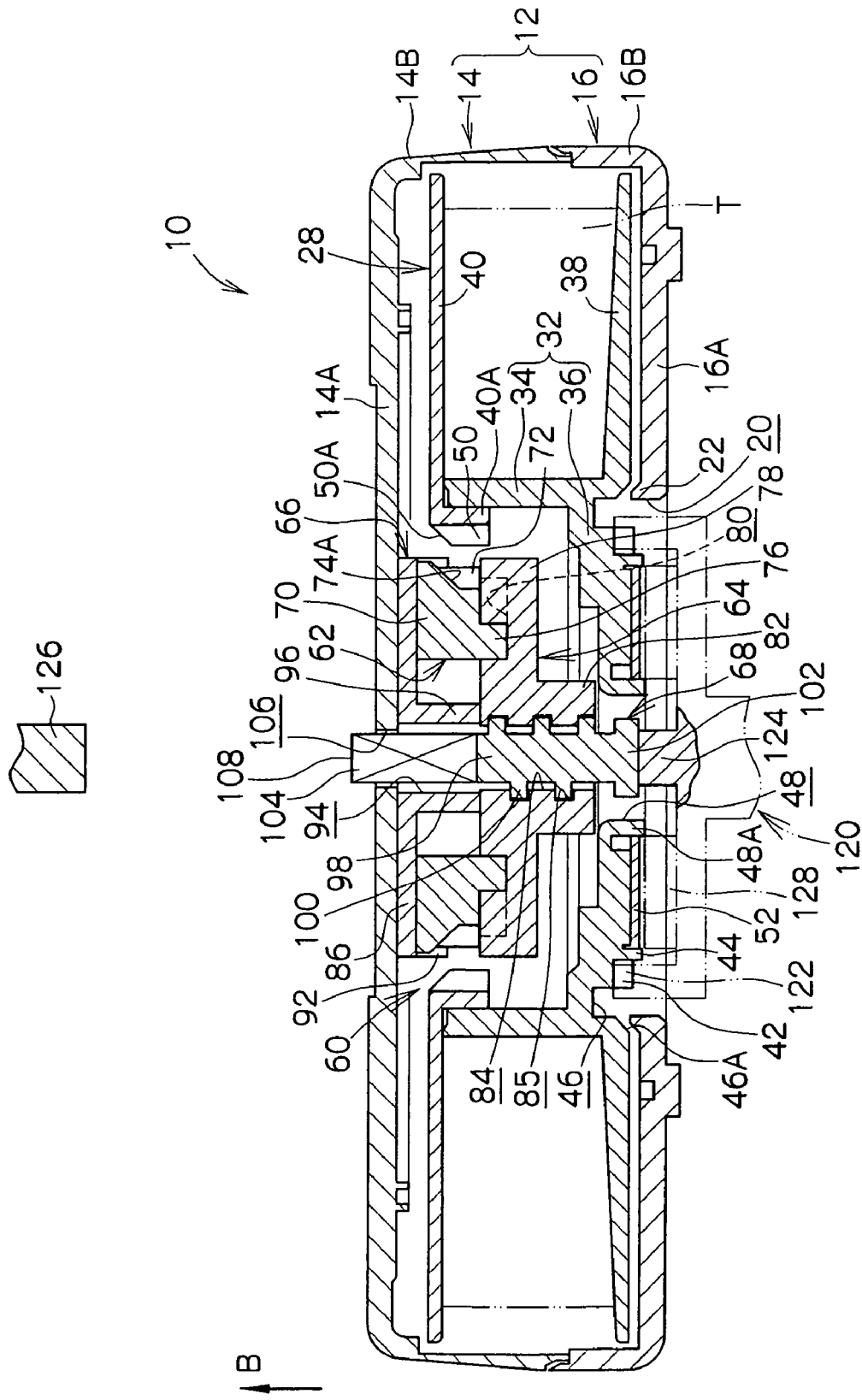
FIG. 3 is a sectional view of a state in which locking of the rotation of the reel is cancelled in the recording tape cartridge relating to the embodiment of the present invention.

A perspective view, as seen from above and at an incline, of the recording tape cartridge 10 is shown in FIG. 1A. A perspective view, as seen from below and at an incline, of the recording tape cartridge 10 is shown in FIG. 1B. Sectional views of the recording tape cartridge 10 are shown in FIGS. 2 and 3. Note that arrow A used appropriately in the respective drawings indicates the direction of loading the recording tape cartridge 10 into a drive device, and for convenience of explanation, the side in the direction of arrow A is the front side. Further, the direction indicated by arrow B is upward.

As shown in these drawings, the recording tape cartridge 10 has a case 12. The case 12 is structured by an upper case 14 and a lower case 16 being joined together. Specifically, the upper case 14 is structured such that a substantially frame-shaped peripheral wall 14B stands erect along the outer edge of a ceiling plate 14A which is substantially rectangular in plan view. The lower case 16 is structured such that a peripheral wall 16B stands erect along the outer edge of a floor plate 16A which has a configuration substantially corresponding to that of the ceiling plate 14A. The case 12 is formed in a substantial box shape by the upper case 14 and the lower case 16 being joined together by ultrasonic welding or screws or the like in a state in which the open end of the peripheral wall 14B and the open end of the peripheral wall 16B abut one another.

At a corner portion of the case 12 at the leading side in the direction of loading the recording tape cartridge 10 into a drive device, the ceiling plate 14A, the peripheral wall 14B, the floor plate 16A and the peripheral wall 16B are respectively cut away, such that an opening 18, which is inclined with respect to the loading direction, is formed. A gear opening 20, which is circular and passes through the floor plate 16A, is formed in the substantially central portion of the floor plate 16A. The gear opening 20 is for exposing a reel gear 42 which will be described later. An annular rib 22 projects toward the inner side of the case 12 at the floor plate 16A at the edge of the gear opening 20, and is for positioning of a reel 28 which will be described later.

A pair of positioning holes 24, 26 are formed in a vicinity of the front end of the outer surface of the floor plate 16A of the case 12. The pair of positioning holes 24, 26 are formed in the shapes of bags within projections (not illustrated) which stand erect from the floor plate 16A toward the interior of the case 12. The positioning holes 24, 26 are disposed so as to be separated from one another on an imaginary line which is orthogonal to the loading direction. The positioning hole 24, which is the positioning hole which is closer to the opening 18, is formed in a substantially square shape, as seen in bottom view, which circumscribes a positioning pin of a drive device. The positioning hole 26 is a long hole whose longitudinal direction runs along the aforementioned imaginary line, and whose width corresponds to the diameter of a positioning pin.

In this way, when the recording tape cartridge 10 is loaded into a drive device and positioning pins are inserted into the respective positioning holes 24, 26, the recording tape cartridge 10 is correctly positioned in the horizontal directions (the left/right direction and the front/back direction) within the drive device.

The portions of the floor plate 16A around the positioning holes 24, 26 are positioning surfaces 24A, 26A which are finished so as to be smoother than the other portions of the floor plate 16A (the design surface of the floor plate 16A). When the positioning pins are inserted into the positioning holes 24, 26, the positioning surfaces 24A, 26A abut positioning surfaces of the drive device which are provided around the positioning pins. In this way, the vertical direction positioning of the recording tape cartridge 10 within the drive device is carried out.

As shown in FIG. 2, the reel 28, which will be described in detail later, is rotatably accommodated within the above-described case 12. Only one reel 28 is provided. A magnetic tape T serving as a recording tape is wound on the reel 28. A leader block 30, which serves as a pull-out member, is attached to the distal end of the magnetic tape T.

When the recording tape cartridge 10 is not being used, the leader block 30 is accommodated and held at the inner side of the opening 18 of the case 12. In this state, the leader block 30 closes the opening 18, and impedes entry of dust and the like into the case 12. An engaging recess 30A is formed in the distal end of the leader block 30. When the magnetic tape T is to be pulled-out within the drive device, a pull-out means, which engages with the engaging recess 30A, pulls the leader block 30 out of the case 12 and guides the leader block 30 to a take-up reel of the drive device. Moreover, the end surface of the leader block 30 at the side opposite the engaging recess 30A is an arc-shaped surface 30B. The arc-shaped surface 30B is fit into the take-up reel and forms a portion of the take-up surface around which the magnetic tape T is taken-up.

(Structure of Reel and Related Parts)

Next, the reel 28 will be described. As shown in FIGS. 2 and 3, the reel 28 has a reel hub 32 which serves as a hub and which structures the axially central portion of the reel 28. The reel hub 32 is formed substantially in the shape of a hollow cylinder having a floor, and has a cylindrical portion 34, and a floor portion 36 which closes the bottom portion of the cylindrical portion 34. A lower flange 38 is coaxial and integral with the reel hub 32, and extends radially outward from an adjacent portion to a side edge or lower edge of the reel hub 32. An upper flange 40 serving as a first flange extends coaxially and integrally toward the radial direction outer side from the open end (the top end) of the cylindrical portion 34 at the reel hub 32. In the reel 28, the magnetic tape T is wound around an outer peripheral surface of the cylindrical portion 34 and between opposing surfaces of the lower flange 38 and the upper flange 40. The cylindrical portion 34 opens upwards.

A reel gear 42, which is formed overall in an annular form which is coaxial with the reel 28, is provided at the bottom end surface of the floor portion 36 of the reel hub 32 (i.e., at the outer surface which is positioned lower than the lower flange 38). The reel gear 42 can mesh with a driving gear 122 (see FIG. 2) which is provided in an annular form at the outer peripheral portion of the distal end of a rotating shaft 120 of a drive device. The reel gear 42 is formed as an external gear whose addenda face downward and whose inner end in the radial direction of the reel 28 is connected by a rib 44.

An annular groove 46 is formed between the reel gear 42 and the outer peripheral portion of the floor portion 36 (the portion in a vicinity of the inner edge of the lower flange 38), in order to enable meshing with the driving gear 122 which is formed as an internal gear. The open end portion at the outer side of the annular groove 46 is a tapered surface 46A which is formed in a tapered shape in correspondence with the annular rib 22 of the case 12. Further, a through hole 48 is provided in a axially central portion of the floor portion 36. A rib 48A, which prescribes the edge portion of the through hole 48, projects from the bottom surface side of the floor portion 36.

The outer diameter of the upper flange 40 is the same as the outer diameter of the lower flange 38. A short tube portion 40A, whose outer diameter corresponds to the inner diameter of the cylindrical portion 34 of the reel hub 32, is provided at the axially central portion of the upper flange 40. The upper flange 40 is coaxially fixed to the reel hub 32 by ultrasonic welding or the like in a state in which the short tube portion 40A is fit into the cylindrical portion 34 in a vicinity of the top end thereof.

Figure 4:
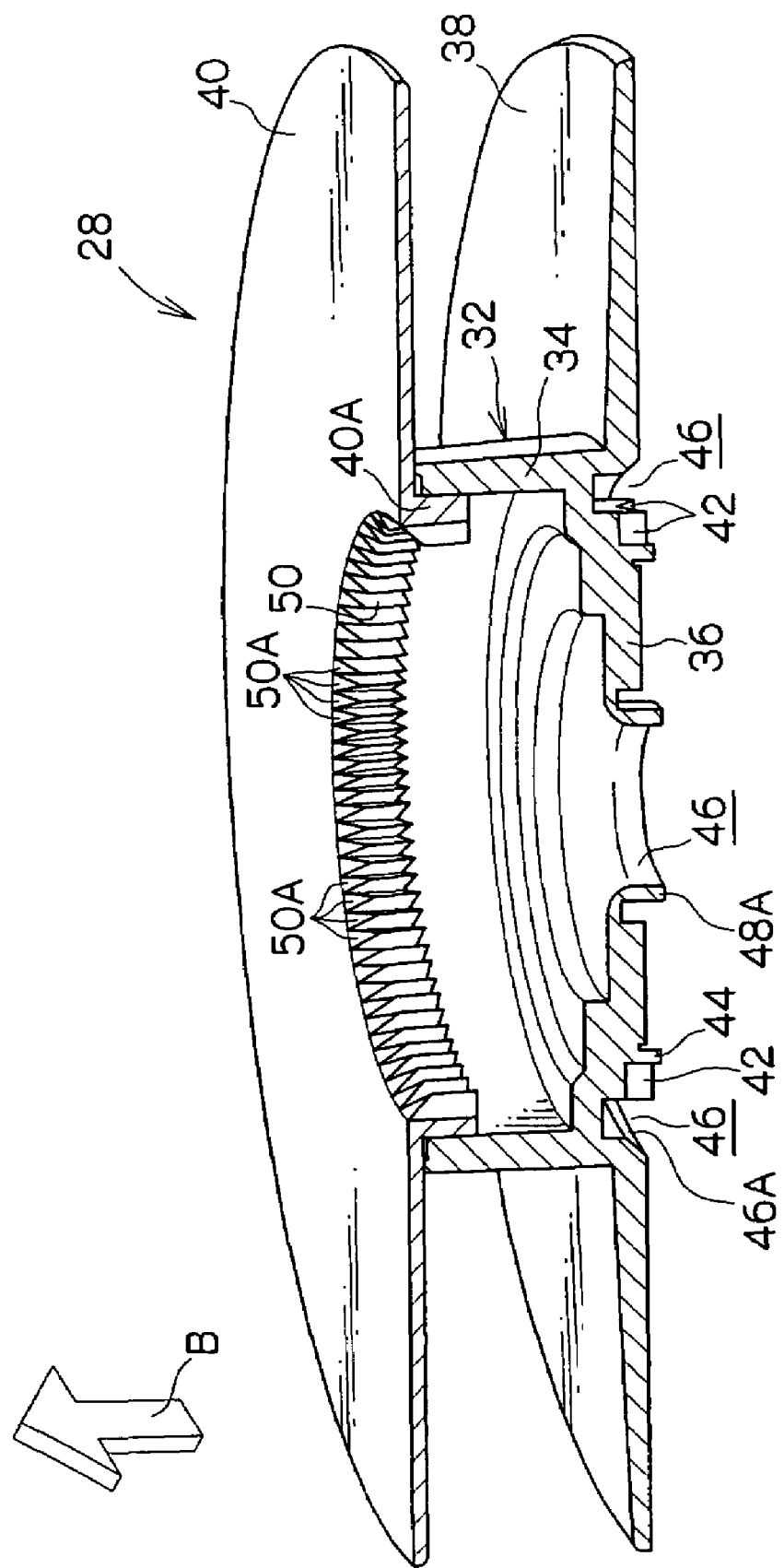
FIG. 4 is a perspective view in which the reel structuring the recording tape cartridge relating to the embodiment of the present invention is cut.

As shown in FIG. 4, an engaging gear 50, which serves as an engaging portion or an internal gear, is formed integrally at the inner peripheral portion of the short tube portion 40A of the upper flange 40. The engaging gear 50 is an internal gear at which the addenda of the respective teeth are directed toward the axial center of the reel 28. The top portions of the respective teeth (end portions in the widthwise direction of the teeth) are inclined portions 50A which are inclined with respect to the axis of the reel 28 from the addenda to the tooth bottoms.

At the above-described reel gear 28, the reel hub 32, which has the reel gear 42 and the like, and the lower flange 38 are formed integrally by resin molding. The upper flange 40, which has the short tube portion 40A at which the engaging gear 50 is formed, is formed by resin molding. A reel plate 52, which is formed of a magnetic material and in an annular shape, is provided, integrally and coaxially by insert molding, between the rib 48A and the rib 44 at the bottom surface of the floor portion 36 of the reel hub 32. The reel plate 52 is for attraction and holding (chucking) by a magnet 128 which is provided at the radial direction inner side of the driving gear 122 at the rotating shaft 120.

The reel 28 is accommodated in the case 12, and when the recording tape cartridge 10 is not being used, the reel 28 is set on the floor plate 16A. Specifically, as shown in FIG. 2, radial direction movement of the reel 28 is restricted mainly due to the lower flange 38 abutting the inner surface of the floor plate 16A, and in this state, the annular rib 22 being disposed within the annular groove 46 and being made to abut (fit together with) the taper surface 46A.

In this state, the reel 28 is on the whole positioned within the case 12, and the reel gear 42 and the reel plate 52 are exposed from the gear opening 20 (see FIG. 1B). Namely, the reel gear 42 does not project out from the outer surface (the lower surface) of the floor plate 16A, but faces the exterior of the case 12 from the gear opening 20. In this way, the reel 28 can be operated, i.e., can be chucked (held) and driven to rotate, from the exterior of the case 12.

(Structure of Lock Mechanism)

As shown in FIGS. 2 and 3, the recording tape cartridge 10 has a lock mechanism 60 which, when the magnetic tape T is not being used, restricts axial direction movement of the reel 28 and impedes rotation of the reel 28 with respect to the case 12, and which, when the recording tape cartridge 10 is loaded in a drive device, allows the reel 28 to rise up and rotate with respect to the case 12. Details of the structure of the lock mechanism 60 will be described hereinafter.

Figure 5:
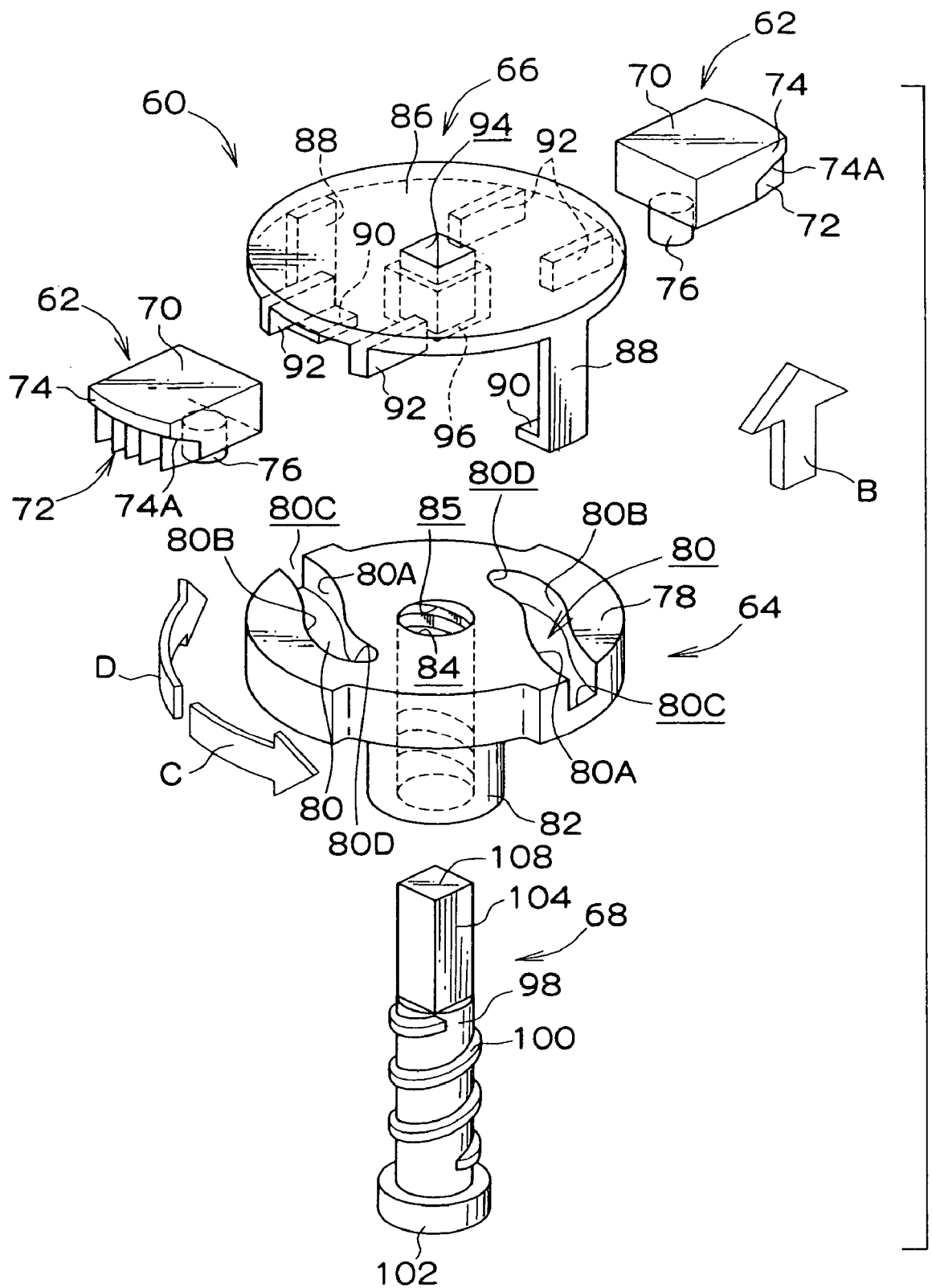
FIG. 5 is an exploded perspective view of a lock mechanism structuring the recording tape cartridge relating to the embodiment of the present invention.

As shown in FIG. 5, the lock mechanism 60 is structured with the following members as the main structural elements thereof: reel locking members 62 which serve as locking members and are able to be set at rotation locking positions (see FIG. 2) at which the reel locking members 62 mesh with the engaging gear 50 of the reel 28, and releasing positions (see FIG. 3) at which the reel locking members 62 release this meshing; a rotating cam member 64 which rotates so as to move the reel locking members 62 between the rotation locking positions and the releasing positions; a supporting member 66 which supports the reel locking members 62 and the rotating cam member 64 such that they are able to move as needed relative to the case; and a clutch member 68 which serves as an operated member, and which is operated by the drive device and rotates the rotating cam member 64.

Figure 6:
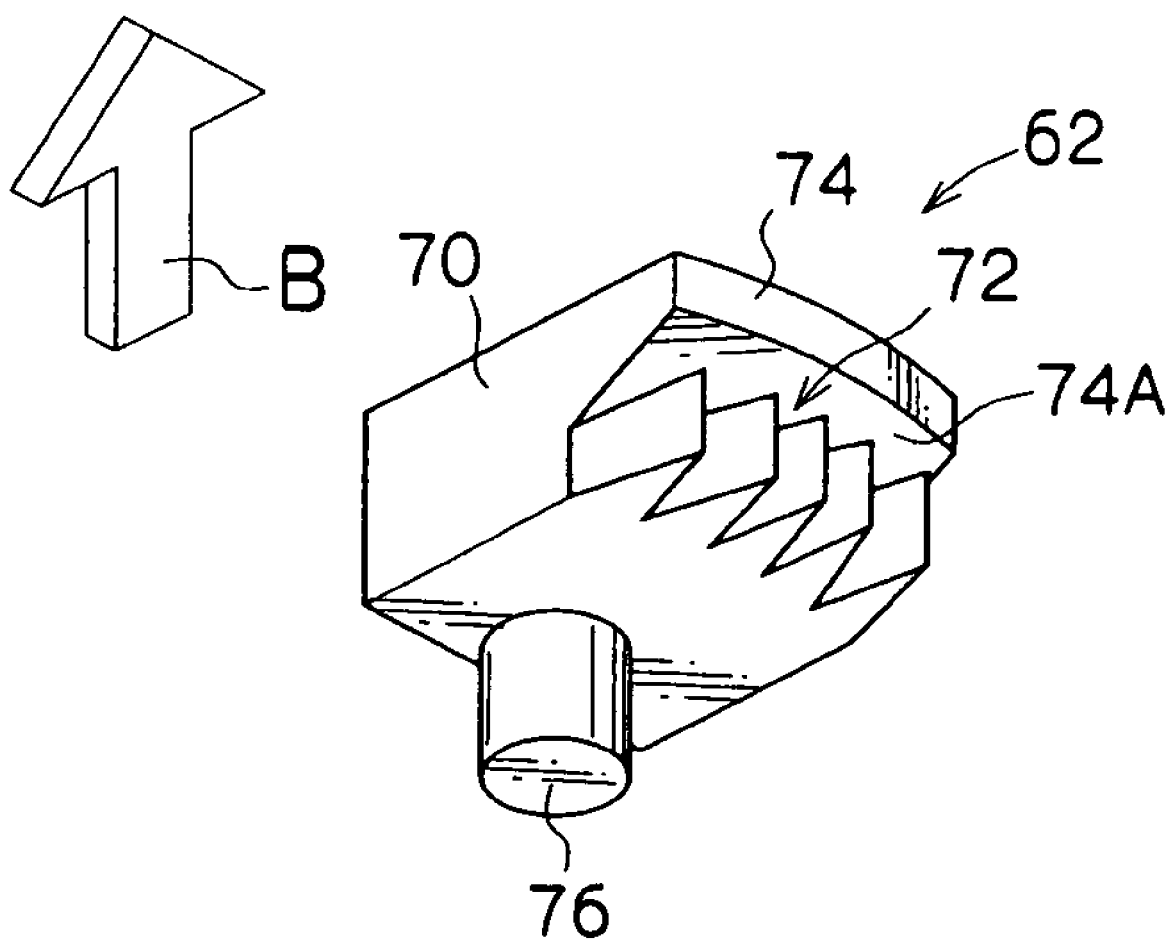
FIG. 6 is a perspective view of a reel locking member structuring the recording tape cartridge relating to the embodiment of the present invention.

A plurality (two in the present embodiment) of the reel locking members 62 are provided. The reel locking members 62 are disposed symmetrically with respect to the axial center of the reel 28, and move in the radial direction of the reel and can mesh with the engaging gear 50. Specifically, as shown in FIG. 6 as well, the reel locking member 62 has a main body portion 70 which is formed in the shape of a substantially rectangular block. A braking gear 72, which is in the form of external teeth which can engage with the engaging gear 50, is formed at one side portion of the main body portion 70.

The position, in the radial direction of the reel 28, where the braking gear 72 meshes with the engaging gear 50 is the rotation locking position of the reel locking member 62. The position, in the radial direction of the reel 28, where this meshing is released is the releasing position (rotation permitting position) of the reel locking member 62. The respective teeth of the braking gear 72 and the respective teeth of the engaging gear 50 are formed in shapes of substantially acute triangles (shapes in which the both edges thereof are tapered) whose addenda are the vertices as seen in plan view, so as to be able to reliably mesh together due to the reel locking member 62 moving in the radial direction of the reel 28.

Further, the top side portion of the braking gear 72 at the main body portion 70 is a connecting portion 74 which connects the top side portions of the respective teeth forming the braking gear 72. The bottom surface of the connecting portion 74 (the braking gear 72 side surface of the connecting portion 74) is an inclined surface 74A which is inclined in correspondence with the inclined portions 50A of the reel 28. The distal end of the connecting portion 74 projects out further than the addenda of the braking gear 72, and is formed in a circular-arc shape. A cam projection 76, which serves as a contact element, projects from the bottom surface of the main body portion 70. The cam projection 76 is formed substantially in the shape of a small solid cylinder. The cam projection 76 is disposed in a vicinity of the side portion of the main body portion 70 which side portion is opposite the side where the braking gear 72 is located.

The reel locking member 62 is provided such that the width of the main body portion 70 is constant, except for at the region where the braking gear 72 is formed, and such that the braking gear 72 and the cam projection 76 do not project out at the transverse direction outer sides of the main body portion 70. The reel locking member 62 is formed, on the whole, so as to be substantially symmetrical with respect to the transverse direction central axis thereof. As will be described in detail later, the reel locking member 62 moves reciprocatingly along the radial direction of the reel 28 between the rotation locking position and the releasing position, in the state in which the transverse direction central axis of the reel locking member 62 coincides with the radial direction of the reel 28. Further, at the reel locking member 62, the height (thickness) of the main body portion 70 including the braking gear 72 and the connecting portion 74 (except for a bottom surface 68A and the distal end which projects out further than the braking gear 72) is constant.

The rotating cam member 64 has a disc portion 78 which is formed substantially in a disc shape. Cam grooves 80 which are cams are formed in the disc portion 78 so as to open upward. A plurality (two in the present embodiment) of the cam grooves 80 are provided in correspondence with the number of the reel locking members 62. The cam projections 76 of the respectively different reel locking members 62 are disposed in the cam grooves 80 so as to be slidable.

Each of the cam grooves 80, together with the cam projection 76 inserted therein, structures a positive motion cam which reciprocatingly moves the reel locking member 62 between the rotation locking position and the releasing position, as the disc portion 78 rotates reciprocatingly around the axial center. Specifically, the cam grooves 80 are inclined with respect to the radial direction of the disc portion 78 which is disposed coaxially with the reel 28. (In the present embodiment, the cam grooves 80 are formed in gentle S shapes as seen in plan view, such that the angles of inclination thereof vary continuously.)

One of the groove walls in the transverse direction of each of the cam grooves 80 is a lock wall 80A which pushes the cam projection 76 outwardly in the radial direction as the cam projection 76 slides therealong, due to the disc portion 78 rotating in the direction of arrow C (see FIG. 5). The other groove wall is a releasing wall 80B which pushes the cam projection 76 to return toward the radial direction inner side as the cam projection 76 slides therealong, due to the disc portion 78 rotating in the direction of arrow D (see FIG. 5). Accordingly, when the rotating cam member 64 rotates in the direction of arrow C, the rotating cam member 64 moves the reel locking members 62 from their releasing positions toward their rotation locking positions. When the rotating cam member 64 rotates in the direction of arrow D, the rotating cam member 64 moves the reel locking members 62 from their rotation locking positions toward their releasing positions.

In the present embodiment, when the cam projection 76 is positioned in a vicinity of an open end 80C of the cam groove 80 which opens toward the radial direction outer side at the outer peripheral portion of the disc portion 78, the reel locking member 62 is positioned at the rotation locking position. When the cam projection 76 is positioned in a vicinity of a closed end 80D which is closed and which is at the side opposite to the open end 80C in the longitudinal direction, the reel locking member 62 is positioned at the releasing position. The respective closed ends 80D also function as stoppers which prevent movement of the reel locking members 62 past their releasing positions and further toward the central axis of the reel. Note that, instead of the open end 80C, a closed end may be provided at the end portion of each cam groove 80 which end portion is at the side opposite to the closed end 80D in the longitudinal direction.

The depth of each cam groove 80 is slightly larger than the height of the cam projection 76 (or, the cam grooves 80 may pass through the disc portion 78 in the direction of plate thickness thereof). The reel locking member 62 moves between the rotation locking position and the releasing position while the bottom surface of the main body portion 70 thereof slides along the top surface of the disc portion 78 of the rotating cam member 64.

A driven tube portion 82 projects from the axially central portion of the bottom surface of the disc portion 78. The driven tube portion 82 is formed substantially in the shape of a hollow cylinder. The interior thereof is a pass-through hole 84 which also passes through the axially central portion of the disc portion 78 along the direction of plate thickness thereof. A spiral groove 85 is formed at the inner peripheral portion of the through hole 84.

The supporting member 66 has a disc portion 86 formed substantially in the shape of a disc. The disc portion 86 is welded or adhered to the ceiling plate 14A in a state in which the top surface of the disc portion 86 abuts the inner surface of the ceiling plate 14A. In this way, the supporting member 66 is fixed in the case 12 substantially coaxially to the reel 28.

Figure 7:
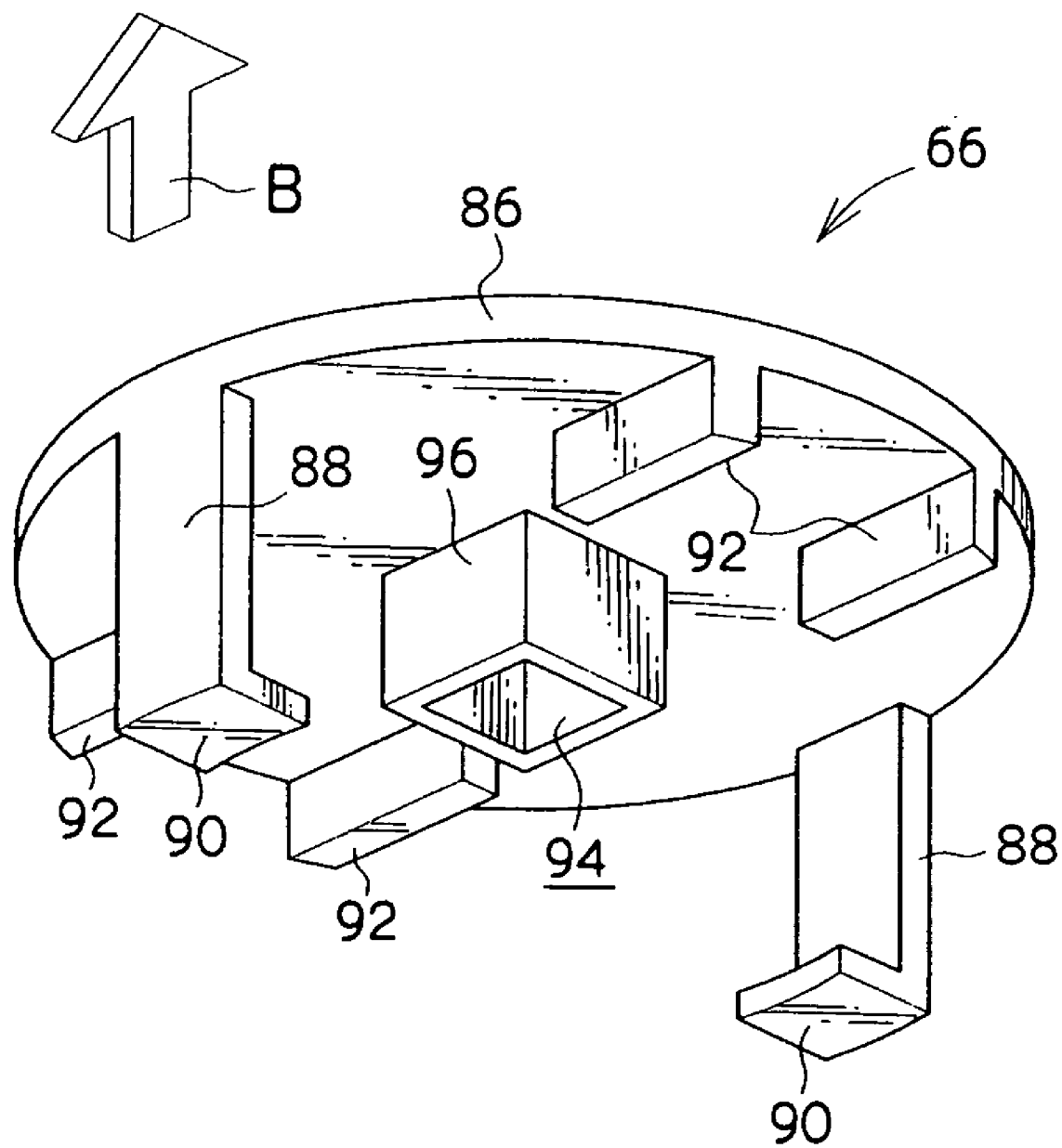
FIG. 7 is a perspective view of a supporting member structuring the recording tape cartridge relating to the embodiment of the present invention.

As shown in FIG. 7, leg portions 88 project from the bottom surface of the disc portion 86 from two places which are symmetrical with respect to the axial center of the disc portion 86. An engaging convex portion 90 projects from the bottom end of each leg portion 88 toward the axis of the disc portion 86. The height from the top surface of the engaging convex portion 90 to the bottom surface of the disc portion 86 is equal to or slightly larger than the sum of the height of the main body portion 70 of the reel locking member 62 and the height of the disc portion 78 of the rotating cam member 64.

The bottom surface of the disc portion 78 slidingly abuts the top surfaces of the engaging projections 90, and the supporting member 66 supports the rotating cam member 64 so as to be rotatable with respect to the case 12. In this state, the reel locking members 62, whose cam projections 76 are disposed within the cam grooves 80, are held such that the top surfaces of the main body portions 70 are slidable along the bottom surface of the disc portion 86 of the supporting member 66. The reel locking members 62 can move between their rotation locking positions and their releasing positions while being prevented from moving vertically with respect to the case 12 (moving in the axial direction of the reel 28) and while being prevented from falling off of the case 12.

Two pairs of guide ribs 92 stand erect from the bottom surface of the disc portion 86. The respective pairs of the guide ribs 92 are symmetrical to one another across the axial center of the disc portion 86. The guide ribs 92 of each pair of guide ribs 92 are provided so as to oppose one another across a central line which is orthogonal to the central line of the disc portion 86 which connects the transverse direction central portions of the leg portions 88. The distance over which the guide ribs 92 of each pair of guide ribs 92 oppose one another corresponds to the width of the reel locking member 62 (the main body portion 70). Each pair of the guide ribs 92 guides the moving direction of a different one of the reel locking members 62 along the radial direction of the disc portion 86, i.e., the radial direction of the reel 28.

In this way, each reel locking member 62 is structured so as to be able to approach and move away from the engaging gear 50 along the radial direction of the reel 28 which coincides with the transverse direction central line of the reel locking member 62, so as to move between its rotation locking position and its releasing position, without the posture thereof changing as the rotating cam member 64 rotates. Note that the height of each guide rib 92 is equal to or smaller than the height of the main body portion 70 of the reel locking member 62. (In the present embodiment, the height of the guide rib 92 is smaller than the height of the main body portion 70.)

A guide hole 94 is formed in the axially central portion of the disc portion 86. A guide tube portion 96 projects along the edge of the guide hole 94 from the bottom surface of the disc portion 86. The outer edges of the guide hole 94 and the guide tube portion 96 are formed in rectangular shapes as seen in plan view, and in the present embodiment, are formed in substantially square shapes as seen in plan view. Hereinafter, the term "guide hole 94" will refer to the region also including the interior of the guide tube portion 96. The guide hole 94 and the guide tube portion 96 may be provided integrally with the ceiling plate 14A.

The height of the guide tube portion 96 is equal to or slightly larger than the height of the main body portion 70 of the reel locking member 62. The bottom end surface of the guide tube portion 96 slidingly contacts the top surface of the disc portion 78 of the rotating cam member 64. Upward movement of the rotating cam member 64, whose downward movement is restricted by the engaging projections 90, is restricted thereby, and not via the reel locking members 62. Namely, it is possible to prevent the reel locking members 62 from being pressed against the disc portion 86 and unneeded frictional force from arising due to the operation of the clutch member 68 in the axial direction of the reel 28 (which operation will be described later). Note that this function may also be realized by making the heights of the guide ribs 92 be equal to or slightly greater than the heights of the main body portions 70. In this case, the guide tube portion 96 can be eliminated, or the height thereof can be reduced.

The clutch member 68 has a solid cylindrical shaft portion 98 which can be inserted into the pass-through hole 84 of the rotating cam member 64. A spiral convex portion 100, which serves as a convex portion corresponding to the spiral groove 85 of the rotating cam member 64, is formed at the outer periphery of the shaft portion 98. In the state in which the shaft portion 98 is inserted in (inserted through) the pass-through hole 84, the spiral convex portion 100 is slidingly disposed in (screwed together with) the spiral groove 85. The spiral convex portion 100, in concert with the spiral groove 85, converts the axial direction reciprocating movement of the shaft portion 98 into reciprocating rotation of the rotating cam member 64. In the present embodiment, the direction of the spirals of the spiral groove 85 and the spiral convex portion 100 is determined such that, due to the shaft portion 98 moving upward, the rotating cam member 64 moves in the direction of arrow D, and due to the shaft portion 98 moving downward, the rotating cam member 64 rotates in the direction of arrow C.

Namely, the rotating cam member 64 and the clutch member 68 can be viewed as structuring a positive motion cam which has the spiral groove 85 serving as a cam groove which is inclined with respect to the axis of the reel 28, and having the spiral projection serving as a contact element. Or, the rotating cam member 64 and the clutch member 68 can be viewed as structuring a feed screw mechanism. Further, in the present embodiment, the portions between the threads of the spiral convex portion 100 can be interpreted as being the spiral groove, and the portions between the threads of the spiral groove 85 can be interpreted as being the spiral convex portion. Note that, for example, in place of the spiral convex portion 100 (or the portions between the threads of the spiral groove 85), it is possible to merely provide a single pin-shaped convex portion which is slidingly disposed in the spiral groove 85 (or in the portions between the threads of the spiral convex portion 100), or to provide a plurality of such pin-shaped convex portions along the locus of the spiral of the spiral groove 85.

The angles of inclination with respect to the axis (the angles of the spirals), the coefficients of static friction (the materials and the finished states), and the like of the spiral groove 85 and the spiral convex portion 100 are set such that when moving force in the axial direction is input from the clutch member 68 side, the spiral groove 85 and the spiral convex portion 100 easily slide, but when torque of a predetermined value or less around the axis is inputted from the rotating cam member 64 side, this sliding is impeded or suppressed by friction. Namely, on the one hand, the rotating cam member 64 can rotate due to a relatively small axial direction moving force of the clutch member 68, whereas, on the other hand, the clutch member 68 cannot be moved in the axial direction by torque of a predetermined value or less which is applied directly to the rotating cam member 64. As will be discussed later, due to rotation of the clutch member 68 around its axis being impeded, as a result, rotation of the rotating cam member 64 itself around its axial center is impeded. In this way, even if force, which attempts to move the reel locking members 62 positioned at their rotation locking positions toward their releasing positions, i.e., even if force which attempts to rotate the rotating cam member 64 in the direction of arrow D, is applied, the reel locking members 62 are held at their respective rotation locking positions due to the aforementioned frictional force resisting this force.

The bottom end portion of the shaft portion 98 is a release operation portion 102 which is pushed from below by a drive device. In the present embodiment, the release operation portion 102 is formed in a simple solid cylindrical configuration (i.e., in the shape of a thick disc) whose diameter is slightly larger than that of the shaft portion 98. The release operation portion 102 is provided so as to be coaxial with the shaft portion 98. A guide shaft portion 104 is provided coaxially at the top end portion of the shaft portion 98. The guide shaft portion 104 is formed, in plan view, in a substantially square configuration corresponding to the guide hole 94 of the supporting member 66, and is inserted through the guide hole 94 so as to be slidable in the axial direction.

The guide shaft portion 104 passes through a through hole 106 which is rectangular in plan view and which is provided so as to pass through the ceiling plate 14A of the case 12. The top end surface of the guide shaft portion 104, which top end surface projects at the case 12, is a lock operation portion 108 which is pressed from above by a drive device.

Note that, in a case in which the lock operation portion 108 is not positioned within a label area 54 (see FIGS. 1 through 3) which is formed in a recessed manner in or is surrounded by a frame-like wall at the outer surface of the ceiling plate 14A, the lock operation portion 108 is substantially flush with the outer surface of the ceiling plate 14A when the reel locking members 62 are positioned at the rotation locking positions.

Due to the guide shaft portion 104 being inserted through the guide hole 94, the clutch member 68 is unable to rotate around the axial center with respect to the case 12, and can only move reciprocatingly in the axial direction. Further, due to the guide shaft portion 104 being inserted through the guide hole 94, the axially central position of the clutch member 68 with respect to the case 12 is determined, and the axial center of the rotating cam member 64, which is screwed together with the clutch member 68, with respect to the case 12 also is determined. Further, the supporting member 66, in which the guide hole 94 is formed, is fixed to the case 12 coaxially to the reel 28 as described above. Therefore, the rotating cam member 64 and the clutch member 68 are disposed coaxially to the reel 28.

When the recording tape cartridge 10 is not being used, the above-described lock mechanism 60 positions the cam projections 76 of the reel locking members 62 in vicinities of the open ends 80C of the cam grooves 80 of the rotating cam member 64, and positions the reel locking members 62 at their rotation locking positions. In this state, the release operation portion 102 of the clutch member 68 is disposed within the through hole 48 of the reel 28 without projecting out therefrom, and is exposed to the exterior of the case 12 (the gear opening 20), and the lock operation portion 108 passes through the through hole 106 of the case 12 and projects slightly outwardly of the case 12.

In this rotation locked state, the inclined surfaces 74A of the reel locking members 62, whose upward and downward movement is restricted between the rotating cam member 64 and the supporting member 66, abut the inclined portions 50A of the reel 28. Namely, the reel locking members 62, which are positioned at their rotation locking positions, are disposed in the space between the reel 28 and the case 12 and fill this space in. In this way, the reel 28, whose rotation is locked, is nipped and held between the floor plate 16A and the reel locking members 62. Then, from this state, when an attempt is made to move the reel 28 upward, forces toward the releasing positions are applied to the reel locking members 62 by the inclined portions 50A and the inclined surfaces 74A. However, upward movement of the reel 28 is restricted because, as described above, the reel locking members 62 are held at their rotation locking positions against these forces due to the friction between the spiral groove 85 and the spiral convex portion 100.

In the lock mechanism 60, when the release operation portion 102 is pushed upward from this rotation locked state, the clutch member 68 moves upwardly. The rotating cam member 64 thereby rotates in the direction of arrow D, and the reel locking members 62 move to their releasing positions. In this state, not only is the meshing between the engaging gear 50 and the braking gears 72 released, but also, the state of abutment between the inclined portions 50A and the inclined surfaces 74A is released, and the reel 28 rises up with respect to the case 12 and becomes able to rotate without contacting the case 12. Note that the distal ends of the connecting portions 74 of the reel locking members 62, which are positioned at their releasing positions, are positioned further toward the radial direction inner side of the reel 28 than the inner edges of the inclined portions 50A (the addenda of the engaging gear 50), and do not impede the reel 28 rising up with respect to the case 12.

Further, in the lock mechanism 60, when, from this rotation permitted state, the lock operation portion 108 is pressed downward and the clutch member 68 is pressed downward in the axial direction of the reel 28, the rotating cam member 64 rotates in the direction of arrow C, and the reel locking members 62 move to their rotation locking positions.

As the driving gear 122 of the rotating shaft 120, which is a structural part of the drive device, meshes with the reel gear 42 of the reel 28, the release operation portion 102 which is exposed from the gear opening 20 is pushed upward by a releasing projection 124 which projects from the axially central portion of the rotating shaft 120. Further, the lock operation portion 108 of the guide shaft portion 104 projecting from the through hole 106 of the ceiling plate 14A is pushed downwardly by, for example, a lock projection 126 which is provided at the side of the recording tape cartridge loading space in the drive device, which side is opposite the side at which the rotating shaft 120 is located, and which relatively approaches the case 12 simultaneously with the operation of the releasing of the meshing between the reel gear 42 and the driving gear 122.

The rotating cam member 64 and the clutch member 68 in the above-described lock mechanism 60 structure the switching means in the present invention.

Note that the recording tape cartridge 10 relating to the present embodiment does not have the compression coil spring which urges the reel 28 downward in the conventional art. In other words, urging force of a compression coil spring does not act on the meshed-together portions of the reel gear and the driving gear. Therefore, there are cases in which the attraction force, by which the reel plate 52 is attracted by the magnet 128 provided at the rotating shaft 120, is set to be large in order for the reel gear 42 and the driving gear 122 of the rotating shaft 120 to be made to mesh together in the state in which the reel 28 is reliably chucked by the rotating shaft 120. Moreover, there are cases in which, by making the meshed-together surfaces of the reel gear 42 and the driving gear 122 be substantially parallel to the axis of rotation of the reel 28, thrust in the direction of causing the reel 28 and the rotating shaft 120 to separate from one another as the reel 28 rotates is not applied.

Next, operation of the present embodiment will be described.

In the recording tape cartridge 10 having the above-described structure, when the magnetic tape T is not being used, movement of the reel locking members 62 toward the axial center of the reel 28 is impeded due to the friction between the spiral groove 85 and the spiral convex portion 100, and the reel locking members 62 are held at their rotation locking positions. The braking gears 72 of the reel locking members 62, which are positioned at their rotation locking positions, mesh with the engagement gear 50, and the inclined surfaces 74A abut the inclined portions 50A of the reel 28 which is disposed on the floor plate 16A. Therefore, rotation of the reel 28 with respect to the case 12 is impeded, movement of the reel 28 in the axial direction is restricted, and the reel 28 hardly joggles at all within the case 12.

At this time, the reel gear 42 of the reel 28 is exposed from the gear opening 20, and the release operation portion 102 of the clutch member 68 is exposed from the through hole 48 of the reel 28. Moreover, the lock operation portion 108 of the clutch member 68 slightly projects out above the ceiling plate 14A. The opening 18 is closed by the leader block 30.

When the magnetic tape T is to be used, the recording tape cartridge 10 is loaded in a bucket (not illustrated) of a drive device along the direction of arrow A. Then, when the recording tape cartridge 10 is loaded to a predetermined depth in the bucket, the lock projection 126 of the drive device contacts the top of the lock operation portion 108 which is projecting out from the ceiling plate 14A. The bucket is lowered from this state, and the rotating shaft 120 of the drive device relatively approaches the gear opening 20 of the case 12 (moves upward), and holds the reel 28. Specifically, while the rotating shaft 120 attracts and holds the reel plate 52 in a non-contact state by the magnet 128, the driving gear 122 of the rotating shaft 120 meshes with the reel gear 42.

As the reel gear 42 and the driving gear 122 mesh together, i.e., as the rotating shaft 120 moves relative to the case 12 in the direction of approaching the case 12 along the axial direction, the releasing projection 124 of the rotating shaft 120 abuts the release operation portion 102 of the clutch member 68, and pushes the clutch member 68 upward. In this way, the rotating cam member 64, which is screwed together with the clutch member 68, rotates in the direction of arrow D. Accompanying this rotation, the cam projections 76 slide while being pressed by the releasing walls 80B of the cam grooves 80. The reel locking members 62 thereby move toward their releasing positions (toward the axial center of the reel 28).

Then, when the bucket stops at the position at which the rotating shaft 120, whose driving gear 122 is meshed together with the reel gear 42, has moved the reel 28 upward from the floor plate 16A by a predetermined amount, the reel locking members 62 reach their releasing positions at which they reliably release the meshing of the braking gears 72 with the engagement gear 50, and the abutment of the inclined surfaces 74A with the inclined portions 50A. The reel 28 thereby becomes able to rotate with respect to the case 12 without contacting the case 12.

In this state, the state of abutment between the release operation portion 102 of the clutch member 68 and the releasing projection 124 is maintained, and the reel locking members 62 are held at their releasing positions. Further, in this state, the amount of projection of the lock operation portion 108 from the ceiling plate 14A increases in accordance with the amount of pushing-up of the clutch member 68.

Due to the lowering of the bucket, i.e. the recording tape cartridge 10, within the drive device, the positioning pins of the drive device enter into the positioning holes 24, 26 of the case 12, and the positioning surfaces of the drive device abut the positioning surfaces 24A, 26A of the case 12. In this way, the recording tape cartridge 10 is positioned in the horizontal directions and the vertical direction with respect to the drive device.

Then, the pull-out means of the drive device pulls the leader block 30 out from the case 12 and guides the leader block 30 to the take-up reel of the drive device, while a pull-out pin (not illustrated) of the pull-out means engages with the engaging recess 30A of the leader block 30. The leader block 30 is fit into the take-up reel, and the circular-arc-shaped surface 30B forms a portion of the take-up surface on which the magnetic tape T is taken up.

In this state, when the leader block 30 rotates integrally with the take-up reel, the magnetic tape T is pulled-out from the case 12 through the opening 18 while being taken-up onto the reel hub of the take-up reel. At this time, the reel 28 of the recording tape cartridge 10 rotates synchronously with the take-up reel due to the torque of the rotating shaft 120 which is transmitted by the driving gear 122 which meshes with the reel gear 42. Information is recorded onto the magnetic tape T or information recorded on the magnetic tape T is played back by a recording/playback head disposed along a predetermined tape path of the drive device. At this time, the release operation portion 102 of the clutch member 68, which cannot rotate with respect to the case 12, slidingly contacts the releasing projection 124 of the rotating shaft 120 which drives and rotates the reel 28.

When the magnetic tape T is rewound onto the reel 28 and the leader block 30 is held in a vicinity of the opening 18 of the case 12, the bucket in which the recording tape cartridge 10 is loaded is raised. The meshing of the reel gear 42 and the driving gear 122 is thereby cancelled. In this way, the reel 28 returns to its initial state in which the meshing of the reel gear 42 with the driving gear 122 is cancelled and the reel 28 is set on the floor plate 16A. When the bucket rises further, the lock projection 126 abuts the lock operation portion 108 of the clutch member 68, and the clutch member 68 is pushed downward accompanying this rising.

Thus, the rotating cam member 64, which is screwed together with the clutch member 68, rotates in the direction of arrow C. Accompanying this rotation, the cam projections 76 slide while being pushed by the lock walls 80A of the cam grooves 80. The reel locking members 62 thereby move toward their rotation locking positions (i.e., toward the radial direction outer side of the reel 28). Then, when the bucket has risen by a predetermined amount (an amount which is the same as the amount of lowering thereof), the reel locking members 62 cause the braking gears 72 to mesh together with the engagement gear 50, and cause the inclined surfaces 74A to abut the inclined portions 50A, and return to their rotation locking positions. When the bucket stops, the recording tape cartridge 10 is discharged from the bucket in the direction opposite to the direction of arrow A.

Here, the positive motion cams, which move the reel locking members 62 between the rotation locking positions and the releasing positions in accordance with the direction of operation of the clutch member 68, are structured by the cam projections 76 of the reel locking members 62 and the cam grooves 80 of the rotating cam member 64. Therefore, it is possible to achieve the effect of impeding rotation of the reel 28 when the recording tape cartridge 10 is not being used, without providing an urging means such as a compression coil spring or the like for urging the reel locking members 62 toward their rotation locking positions.

Because no urging means for urging the reel locking members 62 toward their rotation locking positions is provided, no urging force in an axially compressing direction is applied to the region of abutment of the release operation portion 102 of the clutch member 68 and the releasing projection 124 of the rotating shaft 120. Therefore, the release operation portion 102 and the releasing projection 124 slidingly contact one another as the reel 28 is driven to rotate, and occurrence of wear can be prevented or markedly suppressed.

The inclined surfaces 74A, which abut the inclined portions 50A of the reel 28 when the reel locking members 62 are positioned at the rotation locking positions, are provided at the reel locking members 62. In other words, the reel 28 is nipped-in between the floor plate 16A and the reel locking members 62 which are positioned at the rotation locking positions. Therefore, there is no need to provide, at the recording tape cartridge 10, an urging means such as a compression coil spring or the like for pushing the reel 28 against the case 12 (the floor plate 16A), and it is possible to prevent or suppress joggling of the reel 28 within the case 12 when the recording tape cartridge 10 is not being used. Therefore, there is no need to provide an expensive bearing or the like for absorbing relative rotation between the reel 28 and an urging member.

The rotating cam member 64 is rotated reciprocatingly due to the clutch member 68 reciprocatingly moving rectilinearly in the axial direction. In other words, the motion converting means, which is for converting rectilinear motion into rotation, is provided between the cam member 64 and the clutch member 68. Therefore, the function of preventing rotation of the reel 28 when the recording tape cartridge 10 is not being used is realized by the simple structure in which the clutch member 68 merely reciprocatingly moves rectilinearly, without providing an urging means such as the aforementioned coil spring or the like. Moreover, as compared with a structure in which the rotating cam member 64 is rotated rectilinearly, the structure at the drive device also can be simplified.

In particular, the rectilinear motion of the clutch member 68 is converted into rotation of the rotating cam member 64 due to the spiral convex portion 100, which serves as a convex portion, being disposed in the spiral groove 85. Therefore, the motion converting means itself also can be realized by a simple structure. Further, the reel locking members 62 can be held at their rotation locking positions due to the friction between the spiral groove 85 and the spiral convex portion 100. Therefore, the state in which rotation of the reel 28 is locked and the state in which joggling of the reel 28 is prevented, when the recording tape cartridge 10 is not being used, can be reliably maintained.

In this way, in the recording tape cartridge 10 relating to the present embodiment, there is no need to provide an urging means for urging the reel locking members 62 with respect to the case 12.

Further, in the recording tape cartridge 10, there are provided a plurality (two) of the reel locking members 62 which move in the radial direction of the reel 28 and mesh together with the engaging gear 50 which is an internal gear provided coaxially at the inner side of the reel hub 32. Therefore, even if the reel 28 attempts to move in the radial direction, this movement is restricted. Thus, it is possible to prevent the rotation locked state of the reel 28 from being released inadvertently due to joggling of the reel 28 in the radial direction.

The plurality of reel locking members 62 move between the rotation locking positions and the releasing positions synchronously due to the plural cam grooves 80 which are provided in the single rotating cam member 64. In other words, the reel locking members 62 move between their rotation locking positions and their releasing positions due to the operation of the single clutch member 68. Thus, the number of parts is reduced, and the structure of the drive device does not become complex. In particular, in the present embodiment, because two of the reel locking members 62 are provided, the structure (configuration) of the rotating cam member 64 is prevented from becoming wastefully complex.

Figure 8:
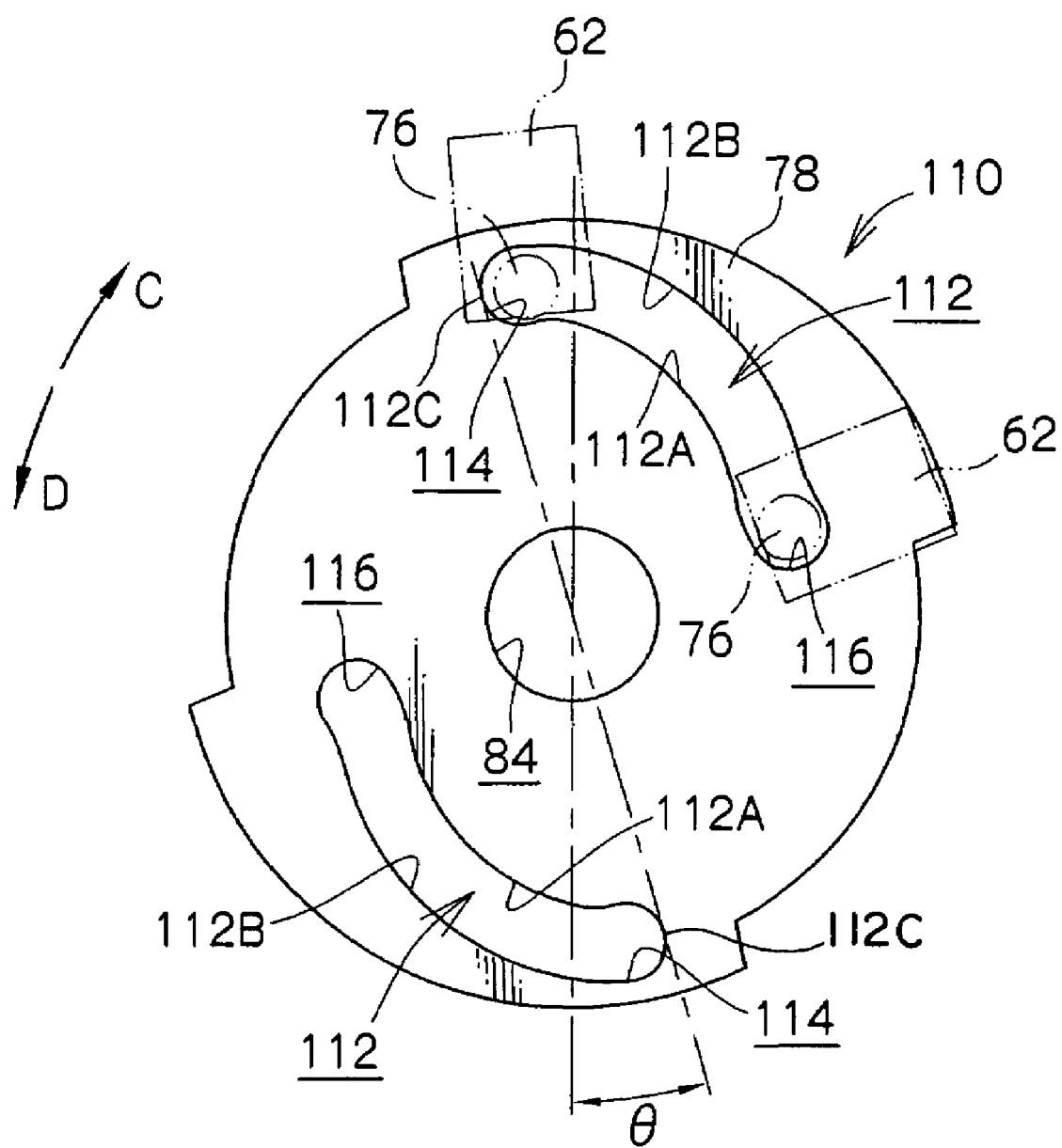
FIG. 8 is a plan view showing a modified example of a rotating cam member structuring the recording tape cartridge relating to the embodiment of the present invention.

Next, a modified example of the present embodiment will be described. Note that parts and portions which are basically the same as those of the above-described embodiment are denoted by the same reference numerals as in the above-described embodiment, and description thereof is omitted. A rotating cam member 110 relating to the modified example is shown in plan view in FIG. 8. In place of the pair of cam grooves 80, the rotating cam member 110 has a pair of cam grooves 112 which, together with the cam projections 76, structure positive motion cams. The cam grooves 112 are open at the top of the disc portion 78.

One of the groove walls in the transverse direction of each of the cam grooves 112 is a lock wall 112A which pushes the cam projection 76 outwardly in the radial direction of the disc portion 78 as the cam projection 76 slides therealong, due to the disc portion 78 rotating in the direction of arrow C. The other groove wall is a releasing wall 112B which pushes the cam projection 76 to return toward the radial direction inner side as the cam projection 76 slides therealong, due to the disc portion 78 rotating in the direction of arrow D. Accordingly, in the same way as with the rotating cam member 64, when the rotating cam member 110 rotates in the direction of arrow C, the rotating cam member 110 moves the reel locking members 62 from the releasing positions toward the rotation locking positions. When the rotating cam member 110 rotates in the direction of arrow D, the rotating cam member 110 moves the reel locking members 62 from the rotation locking positions toward the releasing positions.

In the present modified example, a portion of each cam groove 112 in a vicinity of a closed end 112C thereof which is closed in a vicinity of the outer periphery of the disc portion 78, is a lock holding portion 114 which is formed in the shape of a circular arc which is coaxial with the disc portion 78. Specifically, the circular-arc-shaped region, whose central angle θ to the rounded closed end 112C is set such that the cam projection 76 can enter therein, is the lock holding portion 114. The cam projections 76 of the reel locking members 62, which are positioned at their rotation locking positions, are positioned at the respective lock holding portions 114.

In this way, when forces attempting to move the reel locking members 62, which are positioned at the rotation locking positions, toward the axial center of the reel 28 (the disc portion 78), i.e., toward the releasing positions, are applied, the groove walls of the lock holding portions 114 are pressed by the cam projections 76. However, these pressing forces are not converted into forces for rotating the rotating cam member 110, and as a result, the reel locking members 62 are held at the rotation locking positions. Namely, in the present modified example, the lock holding portions of the cam grooves 112 structure holding means for holding the reel locking members 62 at the rotation locking positions. Therefore, there is no need for a holding means based on the friction between the spiral groove 85 and the spiral projection 100.

When the rotating cam member 110 is rotated in the direction of arrow D, the reel locking members 62 are held at the rotation locking positions until the cam projections 76 are pulled out from the lock holding portions 114. Thereafter, the reel locking members 62 move toward the axial center of the reel 28 and to their releasing positions, while the cam projections 76 slide along releasing walls 112.

The longitudinal direction end portion of each cam groove 112 at the side opposite the lock holding portion 114 is a release holding portion 116 which is positioned further toward the radial direction inner side of the disc portion 78 than the lock holding portion 114. In the same way as the lock holding portion 114, the release holding portion 116 is set as a circular-arc-shaped region which is coaxial with the disc portion 78 and into which the cam projection 76 can enter. The cam projections 76 of the reel locking members 62 which are positioned at the releasing positions are positioned at the release holding portions 116. In this way, it is possible to prevent the reel locking members 62, which are positioned at the releasing positions, from moving inadvertently. Note that it is possible to not provide these release holding portions 116.

In the above-described embodiment and modified example, the release operation portion 102 of the clutch member 68 slidingly-contacts the releasing projection 124 of the rotating shaft 120 as the reel 28 is driven to rotate. However, the way of operating of the recording tape cartridge 10 relating to the present invention is not limited to the same, and the following structure is possible, for example: in a drive device in which the rotating shaft 120 moves in the axial direction and causes the driving gear 122 to mesh with the reel gear 42, after the rotating shaft 120 rises and the reel locking members 62 are moved to their releasing positions, the rotating shaft 120 is lowered slightly, and the reel 28 is driven to rotate in a state in which the releasing projection 124 is set apart from the release operation portion 102. Such a way of operating as well is possible without providing an urging means for urging the reel locking members 62 toward the rotation locking positions. In this case, there are cases in which, for example, when the reel locking members 62 are positioned at their releasing positions, a portion of the lock operation portion 108 is fit together with the through hole 106, and the reel locking members 62 are reliably held at their releasing positions.

Further, the above-described embodiment and modified example are exemplary structures provided with the clutch member 68 which rotates the rotating cam members 64, 110 in the direction of arrow C or in the direction of arrow D by moving in a direction corresponding to the direction of operation by the drive device. However, the present invention is not limited to the same, and for example, the rotating cam member 64 may be rotated directly by the drive device. Further, the clutch member 68 is not limited to, for example, the lock operation portion 108 being pushed and operated by the lock projection 126 fixed to the drive device. The lock operation portion 108 may be pushed and operated by a movable member of the drive device. Or, it is possible for the release operation portion 102 to be pulled and operated from beneath, without providing the lock operation portion 108 (i.e., without the guide shaft portion 104 projecting out from the ceiling plate 14A, and without providing the through hole 106).

In the above-described embodiment and modified example, explanation is given of examples in which the positive motion cams are structured by the cam grooves 80, 112 of the rotating cam member 64, 110 and the cam projections 76 of the reel locking members 62. However, the present invention is not limited to the same. For example, in place of the cam grooves 80 or the like, projection-like cam rails may be provided at one of the rotating cam member 64 and the reel locking members 62, and, in place of the cam projections 76, substantially U-shaped passive cam portions, which can slide along the both transverse direction surfaces of the cam rails, can be provided at the other member. Moreover, the reel locking members 62 are not limited to structures whose upward and downward movement is restricted between the disc portion 86 of the supporting member 66 and the disc portion 78 of the rotating cam member 64. For example, upward and downward movement of the reel locking members 62 may be restricted by forming the cam projections 76 and the cam grooves 80 or the like to be structures which prevent the reel locking members 62 from being pulled out in the upward and downward directions. In this structure, it is possible to reduce the sliding resistance by utilizing a structure in which the reel locking members 62 and the disc portion 86 do not slide against one another. Further, the reel 28 can be nipped-in between the reel locking members 62 and the case 12 without filling in the space between the case 12 and the reel 28, and the degrees of freedom in design increase.

The switching means (positive motion cams) relating to the present invention is not limited to having the cam grooves 80, 112 which are inclined with respect to the radial direction of the reel 28. For example, the switching means may be a member which has cam portions (cam grooves or cam rails or the like) which are provided at inclines with respect to the axial direction of the reel 28 and which, together with the contact elements which are the reel locking members 62, structure the positive motion cams, and the switching means may convert the reciprocating movement along the axial direction of the reel 28 due to the operation of the drive device into reciprocating movement of the reel locking members 62 in the radial direction of the reel 28. As another example, in a structure in which the reel locking members 62 mesh with the engaging gear 50 which is provided at the floor portion 36 so as to face upward, cam portions which are inclined with respect to the axis of the reel 28 may be provided along the peripheral surface around the axis of the reel 28 at the rotating cam member 64, 110, such that the reel locking members 62 move reciprocatingly in the reel axial direction as the rotating cam member 64 rotates reciprocatingly. Further, the operated member for rotating the rotating cam member 64 reciprocatingly is not limited to a structure which is exposed from the gear opening 20. For example, the operated member may be exposed from a window portion provided at the peripheral wall 14B of the case 12 or the like.

The engaging gear 50 is provided at the short tube portion 40A of the upper flange 40 in the above-described embodiment and modified example. However, the present invention is not limited to the same, and, for example, the engaging gear 50 may be provided at the inner peripheral surface of the cylindrical portion 34 of the reel hub 32. Further, it goes without saying that the upper flange 40, rather than the lower flange 38, may be provided integrally with the reel hub 32. Moreover, the above-described embodiment is structured such that movement of the reel 28 in the axial direction is restricted due to the inclined surfaces 68A of the reel locking members 62 abutting the inclined portions 50A provided at the engaging gear 50. However, the present invention is not limited to the same. For example, a structure may be used in which axial direction movement of the reel 28 is restricted by respective portions of the reel locking members 62 (the connecting portions 74 which project out further than the braking gears 72, or the like) abutting the top surface of the upper flange 40 or opposing the top surface of the upper flange 40 with an interval of a predetermined value or less therebetween, and the reel 28 being sandwiched-in between the reel locking members 62 and the case 12.

In the above-described embodiment and modified example, the reel locking members 62 are held at their rotation locking positions by the friction between the spiral groove 85 and the spiral convex portion 100, or by the lock holding portions 114 which are provided continuously with the cam grooves 112. However, the present invention is not limited to the same, and, for example, the function of holding the reel locking members 62 at the rotation locking positions when the recording tape cartridge 10 is not being used (i.e., the holding means) may be realized by providing holding projections at the top surface of the disc portion 78 (at the outer sides of the lock walls 80A and in vicinities of the open ends 80C). These holding projections would abut the reverse surfaces of the reel locking members 62 (the surfaces facing the axial center of the reel 28) as the rotating cam member 64 rotates in the direction of arrow C, and would cancel this state of abutment as the rotating cam member 64 rotates in the direction of arrow D. Moreover, another holding means may be provided independently of the clutch member 68.

The above-described embodiment and modified example are exemplary structures in which two of the reel locking members 62 are provided. However, the present invention is not limited to the same, and for example, the lock mechanism 60 may be structured by providing one or three or more of the reel locking members 62. When three or more reel locking members 62 are provided, there are cases in which they are provided at uniform intervals. Moreover, when only one reel locking member 62 is provided, there are cases in which the range of meshing thereof with the engaging gear 50 along the peripheral direction is set to be large in order to suppress radial direction joggling of the reel 28.

In the above-described embodiment and modified example, the recording tape cartridge 10 is a so-called single-reel recording tape cartridge in which the single reel 28 is accommodated within the case 12. However, the present invention is not limited to the same, and, for example, may be a structure in which the lock mechanism 60 is provided at one or both of the reels of a two-reel recording tape cartridge in which two of the reels 28 (for drawing-out and taking-up) are accommodated.

Further, the magnetic tape T is used as the recording tape in the above-described embodiment and modified example. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

What is claimed is:

1. A recording tape cartridge comprising:
   a reel at which a recording tape is wound around an outer peripheral portion of a hub formed in a hollow-cylindrical shape, the reel being rotatably accommodated within a case;
   an internal gear provided coaxially at an inner side of the hub, and always rotating integrally with the reel;
   a locking member supported so as to be unable to rotate with respect to the case, and moving in a radial direction of the hub so as to be able to be set at a rotation locking position at which the locking member meshes with the internal gear, and a releasing position at which the locking member cancels the meshing;
   a rotating cam member supported so as to be able to rotate with respect to the case, the rotating cam member and the locking member structuring a positive motion cam, in which the rotating cam member rotates toward one direction and moves the locking member from the rotation locking position to the releasing position, and rotates toward another direction and moves the locking member from the releasing position to the rotation locking position; and
   an operated member disposed so as to be exposed to an exterior of the case, and rotating the rotating cam member one of toward the one direction and toward the other direction in accordance with a direction in which the operated member is operated by a drive device.

2. The recording tape cartridge of claim 1, wherein the operated member is disposed so as to move reciprocatingly along an axis of the hub in accordance with the direction in which the operated member is operated by the drive device, and
   a spiral groove is provided around the axis at one of the rotating cam member and the operated member, and a convex portion, which is slidably disposed within the spiral groove, is provided in another of the rotating cam member and the operated member.

3. The recording tape cartridge of claim 1, wherein, when movement of the locking member in an axial direction of the hub is restricted and the locking member is positioned at the rotation locking position, the locking member abuts a surface of the reel which surface intersects the axis, and when the locking member is positioned at the releasing position, the locking member operates so as to release the state of abutment.

4. The recording tape cartridge of claim 1, wherein a plurality of the locking members are provided, and the positive motion cams are structured by the respective plural locking members and the rotating cam member.

5. The recording tape cartridge of claim 1, further comprising a supporting member which supports the locking member and the rotating cam member such that the locking member and the rotating cam member are able to move relative to the case as needed.

6. The recording tape cartridge of claim 1, wherein the locking member has at least two members, and the at least two members are respectively disposed symmetrically with respect to an axis of the reel.

7. The recording tape cartridge of claim 6, wherein the locking member has a main body portion which is formed in a substantially rectangular block shape, and a braking gear in a form of external teeth which can mesh with the internal gear is formed at one side portion of the main body portion.

8. The recording tape cartridge of claim 7, wherein the braking gear has a connecting portion which connects top side portions of respective teeth forming the braking gear, and a distal end of the connecting portion is formed in a circular-arc shape and projects out further than addenda of the braking gear, and the locking member has a cam projection which projects in a substantially solid cylindrical shape from one surface of the main body portion.

9. The recording tape cartridge of claim 8, wherein the rotating cam member has a substantially disc-shaped portion, and the positive motion cam further has a cam groove provided in the substantially disc-shaped portion, and the cam projection can be slidably disposed in the cam groove.

10. A recording tape cartridge comprising:
    a reel accommodated within a case, an engaging portion being provided within a hollow-cylindrical hub around whose outer peripheral portion a recording tape is wound;
    a locking member supported so as to be unable to rotate with respect to the case, and able to be set at a rotation locking position, at which the locking member engages with the engaging portion and, together with the case, locks the reel, and a rotation permitting position, at which the locking member cancels a state of engagement with the engaging portion and a state of locking the reel; and
    switching means, provided within the case, for holding the locking member at the rotation locking position when the recording tape is not in use, and for moving the locking member to the rotation permitting position when the switching means is operated in a first rotatable direction about an axis of the reel by a drive device, and for moving the locking member to the rotation locking position when the switching means is operated by the drive device in a second rotatable direction opposite to the first rotatable direction.

11. The recording tape cartridge of claim 10, wherein the switching means has a rotating cam member supported so as to be able to rotate with respect to the case, and a clutch member rotating the rotating cam member in accordance with external operation of the clutch member, and the rotating cam member and the locking member structure a positive motion cam, in which the rotating cam member rotates toward one direction and moves the locking member from the rotation locking position to the rotation permitting position, and rotates toward another direction and moves the locking member from the rotation permitting position to the rotation locking position.

12. The recording tape cartridge of claim 10, wherein the switching means has a rotating cam member supported so as to be able to rotate with respect to the case, and a rotating cam member and the locking member structure a positive motion cam, in which the rotating cam member rotates toward one direction and moves the locking member from the rotation locking position to the rotation permitting position, and rotates toward another direction and moves the locking member from the rotation permitting position to the rotation locking position, and the positive motion cam has a pair of cam grooves formed in the rotating cam member, and cam projections which are provided at a main body portion of the locking member and can slide within the cam grooves.

13. The recording tape cartridge of claim 10, wherein, when movement of the locking member in an axial direction of the hub is restricted and the locking member is positioned at the rotation locking position, the locking member abuts a surface of the reel which surface intersects the axis, and when the locking member is positioned at the releasing position, the locking member operates so as to release the state of abutment.

14. The recording tape cartridge of claim 11, wherein a plurality of the locking members are provided, and the positive motion cams are structured by the respective plural locking members and the rotating cam member.

15. The recording tape cartridge of claim 11, further comprising a supporting member which supports the locking member and the rotating cam member such that the locking member and the rotating cam member are able to move relative to the case as needed.

16. The recording tape cartridge of claim 10, wherein the locking member has at least two members, and the at least two members are respectively disposed symmetrically with respect to an axial center of the reel.

17. The recording tape cartridge of claim 16, wherein the locking member has a main body portion which is formed in a substantially rectangular block shape, and a braking gear in a form of external teeth which can mesh with the internal gear is formed at one side portion of the main body portion.

18. The recording tape cartridge of claim 17, wherein the braking gear has a connecting portion which connects top side portions of respective teeth forming the braking gear, and a distal end of the connecting portion is formed in a circular-arc shape and projects out further than addenda of the braking gear, and the locking member has a cam projection which projects in a substantially solid cylindrical shape from one surface of the main body portion.

19. The recording tape cartridge of claim 18, wherein the rotating cam member has a substantially disc-shaped portion, and the rotating cam member further has a cam groove provided in the substantially disc-shaped portion, and the cam projection can be slidably disposed in the cam groove.

* * * * *